Patented Feb. 1, 1944

2,340,838

UNITED STATES PATENT OFFICE 2,340,838

RESINOUS COMPOSITION

Ferdinand P. Otto and Orland M. Reiff, Woodbury, N. J., assignors to Socony-Vacuum Oil Company, Incorporated, New York, N. Y., a corporation of New York No Drawing. Application December 19, 1941, Serial No. 423,580

4 Claims. (Cl. 260—61)

This invention has reference to a resinous composition of matter and is particularly concerned with a hard resin derived by mono-alkylation of aromatic bodies.

In one respect, the present invention is related to the disclosure of Patent No. 2,191,498, issued February 27, 1940, to O. M. Reiff and the copending application of O. M. Reiff and J. J. Giammaria, Serial No. 427,588, filed January 21, 1942. Both of said disclosures are directed to aromatic compounds and mixtures of aromatic compounds which have been substituted with long chain aliphatic radicals by a Friedel-Crafts reaction. In both instances, the aliphatic radical is preferably derived from petroleum wax. In these respects the present disclosure resembles the earlier disclosures noted above. As respects properties of the compositions concerned, the present invention relates to material of widely different nature. The products of the said patent are viscous liquids, soluble in lubricating oil, obtained by reaction of aromatics with chlorinated wax of about 14% chlorine content in such proportions as to polyalkylate the aromatic. The compositions described in the said application are plastic, rubber-like masses insoluble in hydrocarbon oils which result from reaction of an excess of chlorinated wax of high chlorine content (more than 25%) with aromatic compounds.

The products of this invention are hard resinous bodies soluble in varnish resin solvents and are derived by reacting highly chlorinated wax, or other suitable aliphatic hydrocarbons, containing from about 40% to about 60% of chlorine with aromatic compounds and mixtures of such compounds in proportions to theoretically result in mono-alkylation of the aromatic. Preferably the aromatic reactant is used in substantial excess with respect to the chlorine content. By following the teachings of this invention as outlined above and described in greater detail below, the desired hard resin is obtained in a form admirably suited to the formation of fine coating compositions and for other purposes that will be apparent to those skilled in the art.

Of the two reactants, the chlorinated aliphatic seems to be the more important in affecting the characteristics of the final product. Good results are obtained with aromatic compounds in general by reaction with aliphatic hydrocarbons having upwards of about 10 carbon atoms, which hydrocarbons have been chlorinated to the extent of about 40% to 60% by weight. Preferably an aliphatic compound of about 50% chlorine content is employed. Some variations in properties of the resins are noted with variations in the character of the aromatic used but the general properties of a hard resin are found within the above limits of chlorination when the proportions of reactants are such that there is present in the reaction mixture at least one mol of aromatic compound for each mol of combined chlorine in the chlorinated aliphatic. It is understood, of course, that other halogens than chlorine are available for the purposes of the invention and chlorine is discussed here as exemplary because it is the halogen generally used for the present purpose.

Although aliphatic compounds and mixtures of relatively low molecular weight, about 10 carbon atoms, are suitable; best results are obtained by the use of chlorinated petroleum waxes. Such waxes often contain some components of as few as 15 carbon atoms but the predominant portion of any such wax is usually composed of aliphatic hydrocarbons of 20 or more carbon atoms with an average of about 24 carbon atoms and an average molecular weight of about 350.

The hard, resin compositions derived from the reaction of chlorinated wax with aromatic compounds, might be more aptly described as arylated waxes because of their high aromatic content. Hard resins derived from phenol for instance, have a combined phenol content of about 40%, the remainder of the molecule consisting of combined wax. A trace of chlorine is ordinarily present from incomplete reaction, but is not necessary for the formation of a hard resin.

The compositions may be represented by the following general formulae which is not an attempt to give, however, an exact representation of the molecule. For simplicity the different aromatic nuclei are represented by the phenyl radicals.

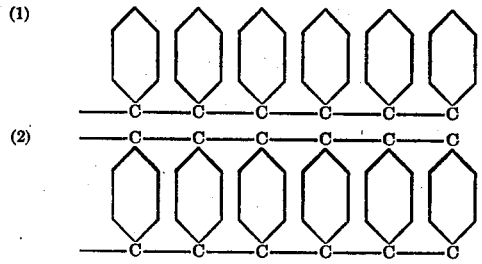

Although a sufficient amount of the aromatic compounds is used in the reaction with the chlorinated wax that only mono-substitution of the aromatic nucleus should occur theoretically, as represented by the first formula, apparently some polysubstitution also takes place as represented by the second formula. The compounds are represented with a single attachment of the aromatic group to each wax group, but where polysubstitution occurs, apparently the aromatic group will be attached in some cases to more than one carbon of the same wax group, particularly in reactions with aromatic compounds of the condensed nuclei and polycyclic type.

The foregoing conclusions are substantiated by the molecular weights of the wax aromatic resins which were determined by the boiling point method, using benzene as solvent. The following results were obtained.

| Resin | Mol ratio of aromatic to combined chlorine | Degree of chlorination | Molecular weight |
|---|---|---|---|
| Wax benzene | 2 | 50 | 1,330 |
| Wax phenol | 2 | 45 | 1,030 |
| Wax diphenyl | 4:3 | 50 | 550 |
| Wax diphenyl oxide | 4:3 | 50 | 1,000 |
| Wax naphthalene | 2 | 50 | 1,250 |

Some chain formation would be expected to occur in the reaction of aromatic compounds with highly chlorinated waxes, in which case the following representation would be applicable, but the low molecular weights of the resins indicate little chaining of the arylated wax molecules.

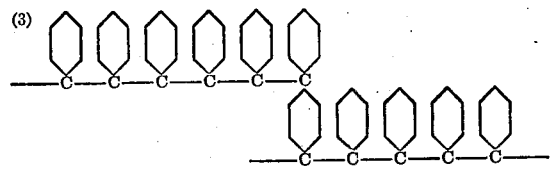

The resins consist apparently of a mixture of the compounds represented by Formulas 1, 2 and 3. Because of the complexity of the mixtures, no attempt has been made to separate the resins into their constituents.

The different aromatic compounds are not equivalent in respect to the degree of chlorination of the wax required to produce a resin of the same degree of hardness and same melting point. Further, each aromatic compound can be reacted with chlorwax of variable chlorine content to obtain products of different degrees of hardness and different melting points. For a chlorinated wax of different chlorine content, a harder resin is derived from phenol than from aromatic hydrocarbons or aromatic ethers. In the following examples, a proportion of reactants is given whereby a resin of desirable degree of hardness and suitable melting point can be formed from different aromatic compounds. Examples only of unsubstituted hydroxyaromatic and aromatic hydrocarbons and aromatic ethers are given. Aromatic compounds containing low molecular weight alkyl substituents as in the case of toluene, xylene and methyl-naphthalene require reaction with chlorinated wax of higher chlorine content to obtain a resin of comparable hardness.

EXAMPLE I

Wax Phenol Resin

*Reaction mixture*

| | Grams |
|---|---|
| Chlorinated wax of 45% chlorine content | 600 |
| Phenol (100% in excess of amount required for reaction) | 1430 |
| AlCl₃ (30% by weight, based on weight of chlorinated wax) | 180 |
| Zinc dust (for decolorizing) | 300 |

Paraffin wax of A. S. T. M. melting point of about 126° F. and of average molecular weight of about 350 is melted, and a current of chlorine is introduced at a temperature of about 200° F. until about 45% by weight of chlorine is absorbed. The rate of absorption of chlorine can be materially increased by carrying out the reaction in the presence of light. The phenol is then introduced, followed by gradual addition of the anhydrous AlCl₃ at a temperature of about 60° C. with rapid stirring. The temperature of the mixture is gradually raised to about 175° C. during a 2-hour period and held at this point until the evolution of HCl is complete, which will require about 4 hours.

The color of the reaction mixture can be lightened by the reducing action of zinc dust and dilute hydrochloric acid. This reduction is carried out by adding 300 grams of zinc dust and 100 c. c. of water at about 90° C. and stirring the mixture several hours. In order to obtain a product of lighter color, it is desirable to add additional hydrochloric acid and continue the reduction several hours longer. As an aid to stirring the reaction mixture, it is desirable to add about 500 c. c. of benzene before carrying out the reduction procedure. The reaction mixture is then filtered to remove excess zinc, followed by water washing to remove acid, zinc chloride and aluminum chloride and then topping by heating to about 180° C. under diminished pressure to remove solvent and unreacted phenol. The product obtained is a light brown, hard resin of about 40% phenol content.

This reaction procedure is applicable to the production of hard resins from hydroxyaromatic compounds in general. In the preparation of hard resins by the reaction of chlorinated wax with aromatic hydrocarbons and aromatic ethers, essentially the same reaction procedure is used. Less AlCl₃ is required for the reaction. In the formation of hard resins from the following reaction mixtures, a top reaction temperature of about 150° C. is used in carrying out the Friedel-Crafts reaction. In the case of aromatic hydrocarbons boiling below 150° C., the Friedel-Crafts reaction is carried out at the boiling point of the aromatic compounds. Benzene, for instance, is converted to a hard resin by reaction with chlorinated wax at 80° C. Reaction mixtures for several resins within the scope of the invention are set out below.

EXAMPLE II

Wax Benzene Resin

| | Grams |
|---|---|
| Chlorinated wax of 50% chlorine content | 150 |
| Benzene (100% in excess of amount required for reaction) | 330 |
| AlCl₃ (20% by weight based on chlorwax) | 30 |
| Zinc dust (for decolorizing) | 100 |

EXAMPLE III

Wax Diphenyl Resin

| | Grams |
|---|---|
| Chlorinated wax of 50% chlorine content | 150 |
| Diphenyl (50% in excess of amount required for reaction) | 485 |
| AlCl₃ | 30 |
| Zinc dust (for decolorizing) | 100 |

EXAMPLE IV

Wax Naphthalene Resin

| | Grams |
|---|---|
| Chlorinated wax of 50% chlorine content | 140 |
| Naphthalene (100% in excess of amount required for reaction) | 520 |
| AlCl₃ | 28 |
| Zinc dust (for decolorizing) | 100 |

EXAMPLE V

WAX DIPHENYLOXIDE RESIN

| | Grams |
|---|---|
| Chlorinated wax of 50% chlorine content | 100 |
| Diphenyloxide (50% in excess of amount required for reaction) | 348 |
| AlCl₃ | 20 |
| Zinc dust | 100 |

The preparation of hard resins by the reaction of chlorinated paraffins (formed from paraffins of lower molecular weight than the wax range) with aromatic compounds, is carried out according to the procedures given in the foregoing reactions with chlorinated wax. The paraffinic material is chlorinated to the same extent as in the case with wax and reacted with the various aromatic compounds in a similar manner.

EXAMPLE VI

RESIN FROM REACTION OF CHLORINATED STODDARD SOLVENT WITH PHENOL

*Reaction mixture*

| | Grams |
|---|---|
| Chlorinated Stoddard solvent—50% chlorine content | 150 |
| Phenol (100% in excess of amount required for reaction) | 404 |
| Aluminum chloride (30% based on weight of chlorinated aliphatic) | 45 |
| Zinc dust | 100 |

To a reaction mixture consisting of the chlorinated Stoddard solvent and phenol at 55° C. is added 45 grams of aluminum chloride. The temperature is then gradually raised to 175° C. and held there until the evolution of hydrogen chloride practically ceases, which will require about 2 hours. The reduction step then follows, consisting of dilution with 300 cc. of Stoddard solvent and the addition of zinc dust and 30 cc. of water, followed by refluxing the mixture for two hours. At this point, it is desirable to add 100 cc. of concentrated hydrochloric acid and continue the reduction for several hours longer to obtain improved decolorization. The product is then filtered, water washed until neutral and topped to 200° C. under diminished pressure (5 mm.) to remove the excess phenol and solvent. The product obtained is a dark-brown, hard resin. The resins prepared according to the foregoing examples are generally light brown in color but may be substantially improved as to color by catalytic hydrogenation without materially affecting their physical properties. Raney nickel is an excellent catalyst for this purpose and the color of the resins may be reduced to pale yellow by procedures set out below.

EXAMPLE VII

| | Grams |
|---|---|
| Wax diphenyl of Example III | 100 |
| Dioxane | 500 |
| Raney nickel | 20 |

The resin is dissolved in approximately five times its weight of dioxane and then placed in a high pressure shaker-bomb along with 20% by weight of Raney nickel catalyst. The catalyst is prepared according to Covert and Adkins, J. A. C. S. 54, 4116 (1932). The initial pressure of hydrogen in the bomb is 1500 lbs./sq. inch. The temperature is then raised to 500° F. and held there for a period of 7 hours during which time the pressure remains at 2700 lbs./sq. inch. After cooling, the reaction mixture is removed from the bomb and filtered to remove catalyst. This is followed by topping to 175° C. under diminished pressure (5 mm.) to remove the solvent and to obtain the finished product.

EXAMPLE VIII

| | Grams |
|---|---|
| Wax phenol of Example I | 100 |
| Dioxane | 500 |
| Raney nickel | 20 |

The treatment is conducted in substantially the same fashion as in Example VII.

The alkylated aromatic compounds will undergo chemical reactions of which the parent aromatic compounds are capable, but with formation of products of different physical characteristics. The hard resins can be improved, for instance, by reaction with formaldehyde and other resinifying agents.

The hard resins vary from brown to pale yellow or colorless compounds depending upon the degree of reduction with hydrogen. The resins are soluble in varnish resin solvents and have been found to give highly desirable coatings.

Although the resin forming reaction has been described as conducted with the use of an aluminum chloride catalyst, it will be understood that any suitable alkylation catalyst may be used, preferably a catalyst of the type employed in Friedel-Crafts reactions in general.

It will be seen that the invention is equally applicable to the use of pure aromatic compounds and mixtures of aromatics, with or without compounds other than aromatics. The term "aromatic material" is accordingly used in the claims to comprehend these aromatic compositions within the scope of the invention, it being understood that proportions recited relate only to the reactive aromatic compounds and do not include diluents, impurities and the like.

We claim:

1. A hard resinous light-colored composition of matter formed by reacting a phenol with a chlorinated petroleum wax containing about 40% to about 60% by weight of chlorine in a mol ratio of not less than one mol of phenol for each mol of combined chlorine in the presence of a Friedel-Crafts type catalyst, adding metallic zinc and water to reaction product to decolorize the same and catalytically hydrogenating the product from treatment with zinc and water.

2. A hard resinous composition of matter formed by reacting a phenol with a chlorinated petroleum wax containing about 40% to about 60% by weight of chlorine in a mol ratio of not less than one mol of phenol for each mol of combined chlorine in the presence of a Friedel-Crafts type catalyst.

3. A hard resinous light-colored composition of matter formed by reacting a phenol with a chlorinated petroleum wax containing about 50% by weight of chlorine in a mol ratio of not less than one mol of phenol for each mol of combined chlorine in the presence of a Friedel-Crafts type catalyst, adding metallic zinc and water to reaction product to decolorize the same and catalytically hydrogenating the product from treatment with zinc and water.

4. A hard resinous composition of matter formed by reacting a phenol with a chlorinated petroleum wax containing about 50% by weight of chlorine in a mol ratio of not less than one mol of phenol for each mol of combined chlorine in the presence of a Friedel-Crafts type catalyst.

FERDINAND P. OTTO.
ORLAND M. REIFF.